(12) United States Patent
Condon et al.

(10) Patent No.: US 12,482,339 B2
(45) Date of Patent: Nov. 25, 2025

(54) CONNECTED DEVICE CONTROL WITH EXTERNAL DATA

(71) Applicant: DISH Network L.L.C., Englewood, CO (US)

(72) Inventors: Caroline Condon, Denver, CO (US); Micah Moore, Windsor, CO (US); Jeffrey Mailloux, Monument, CO (US); James Brunner, Parker, CO (US); Morgan Kirby, Palmer Lake, CO (US); Neil Marten, Lakewood, CO (US); Luke VanDuyn, Conifer, CO (US)

(73) Assignee: DISH Network L.L.C., Englewood, CO (US)

( * ) Notice: Subject to any disclaimer, the term of this patent is extended or adjusted under 35 U.S.C. 154(b) by 396 days.

(21) Appl. No.: 17/645,140

(22) Filed: Dec. 20, 2021

(65) Prior Publication Data

US 2023/0196891 A1   Jun. 22, 2023

(51) Int. Cl.
*G08B 13/196*   (2006.01)
*G06F 21/31*   (2013.01)
*G08B 21/10*   (2006.01)

(52) U.S. Cl.
CPC ....... *G08B 13/19602* (2013.01); *G06F 21/31* (2013.01); *G08B 13/19656* (2013.01); *G08B 13/19665* (2013.01); *G08B 21/10* (2013.01)

(58) Field of Classification Search
CPC ........ G08B 13/19602; G08B 13/19656; G08B 13/19665; G08B 21/10; G08B 13/196; G08B 25/00; G06F 21/31
USPC ......................................................... 382/103
See application file for complete search history.

(56) References Cited

U.S. PATENT DOCUMENTS

| 10,630,943 | B1* | 4/2020 | Mahar | H04N 7/181 |
|---|---|---|---|---|
| 2011/0057796 | A1* | 3/2011 | Candelore | G08B 25/14 340/565 |
| 2016/0021040 | A1* | 1/2016 | Frei | H04L 61/5061 709/224 |
| 2018/0018081 | A1* | 1/2018 | Dattilo-Green | H04N 7/18 |
| 2018/0151039 | A1* | 5/2018 | Lemberger | H04L 12/4625 |
| 2018/0158312 | A1* | 6/2018 | Tannenbaum | G07C 9/00 |
| 2018/0332331 | A1* | 11/2018 | Dauvin | H04N 21/2541 |
| 2021/0241606 | A1* | 8/2021 | Kinney | G08B 25/008 |
| 2021/0266346 | A1* | 8/2021 | Gordon | H04L 63/0245 |

(Continued)

OTHER PUBLICATIONS

"Providing a Camera Stream on an Ancillary Display" by the IP.com Prior Art Database, IP.com Disclosure No. IPCOM000255139D Publication Date: Sep. 4, 2018 (Year: 2018).*

(Continued)

*Primary Examiner* — Ping Y Hsieh
*Assistant Examiner* — Heath E. Wells
(74) *Attorney, Agent, or Firm* — KW Law, LLP

(57) ABSTRACT

Systems and method are provided for controlling a smart home device. In one embodiment, a method, performed by a server, for controlling the smart home device including detecting a smart home device in response to an internet protocol address of a data packet transmitted on a network, determining a function of the smart home device, receiving an event alert from an external data source, associating the function of the smart home device with the event alert, and transmitting a control signal to initiate the function of the smart home device in response to the association of the function with the event alert.

12 Claims, 6 Drawing Sheets

(56) References Cited

U.S. PATENT DOCUMENTS

2021/0367803 A1* 11/2021 Gould .................. H04W 48/18
2022/0148397 A1*  5/2022 Schoeman .......... H04L 12/2823

OTHER PUBLICATIONS

A framework of smart homes connected devices using Internet of Things, M. Bala Krishna, Anudit Verma, 2016 2nd International Conference on Contemporary Computing and Informatics (IC3I) (2016, pp. 810-815), Dec. 1, 2016 (Year: 2016).*

* cited by examiner

500

CONNECTED DEVICE CONTROL WITH EXTERNAL DATA

INTRODUCTION

The present disclosure generally relates to connected devices and control of connected devices in response to external data. Specifically, a connected device hub or server may perform a method for controlling the smart home device including detecting a smart home device determining a function of the smart home device, receiving an event alert from an external data source, and initiating initiate the function of the smart home device in response to the association of the function with the event alert, In recent years, connected home devices have become more and more ubiquitous. Connected, doorbells, cameras, lights, data terminals, and thermostats. These devices may be programmed by a user to automatically perform routine functions, such as turning off lights at a certain time, adjusting thermostat temperatures at certain times, or the like. These devices are typically connected to a controller or the like via a wireless network and/or the internet. This connection allows them to be controlled remotely by a user, such that the user can update schedules, functions and operating states.

Programming these connected home devices may be problematic for casual users. Often during initial deployment of these connected devices, a user may have only one or two connected devices and may not be maximizing the utility of these devices. of the Furthermore, updating the programming of these devices to respond to external events may be burdensome to even advanced users. Accordingly, it is desirable to provide systems and methods that address these problems and offer solutions to control these connected devices with external data. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are connected device control methods and systems and related circuitry for provisioning computational systems, methods for making and methods for operating such systems, and systems equipped with connected device control systems. By way of example, and not limitation, presented are various embodiments of connected device control in response to external data.

In accordance with an aspect of the disclosure, a method performed by a server, for controlling a smart home device including detecting a smart home device in response to an internet protocol address of a data packet transmitted on a network, determining a function of the smart home device, receiving an event alert from an external data source, associating the function of the smart home device with the event alert, and transmitting a control signal to initiate the function of the smart home device in response to the association of the function with the event alert.

In accordance with another aspect of the disclosure, a server for controlling a smart home device including a network interface for receiving an data packet transmitted by a smart home device, for receiving an event alert from an external data source, and for transmitting a control signal to the smart home device, and a processor for detecting the smart home device in response to an internet protocol address of the data packet, for determining a function of the smart home device, and for generating the control signal to initiate the function of the smart home device in response to the event alert being associated with the function of the smart home device.

In accordance with another aspect of the disclosure, a smart home hub including a network interface for receiving an data packet transmitted by a smart home device, for receiving an event alert from an external data source, and for transmitting a control signal to the smart home device, and a processor for determining a function of the smart home device, and for generating the control signal to initiate the function of the smart home device in response to the event alert being associated with the function of the smart home device.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

Figure 1:
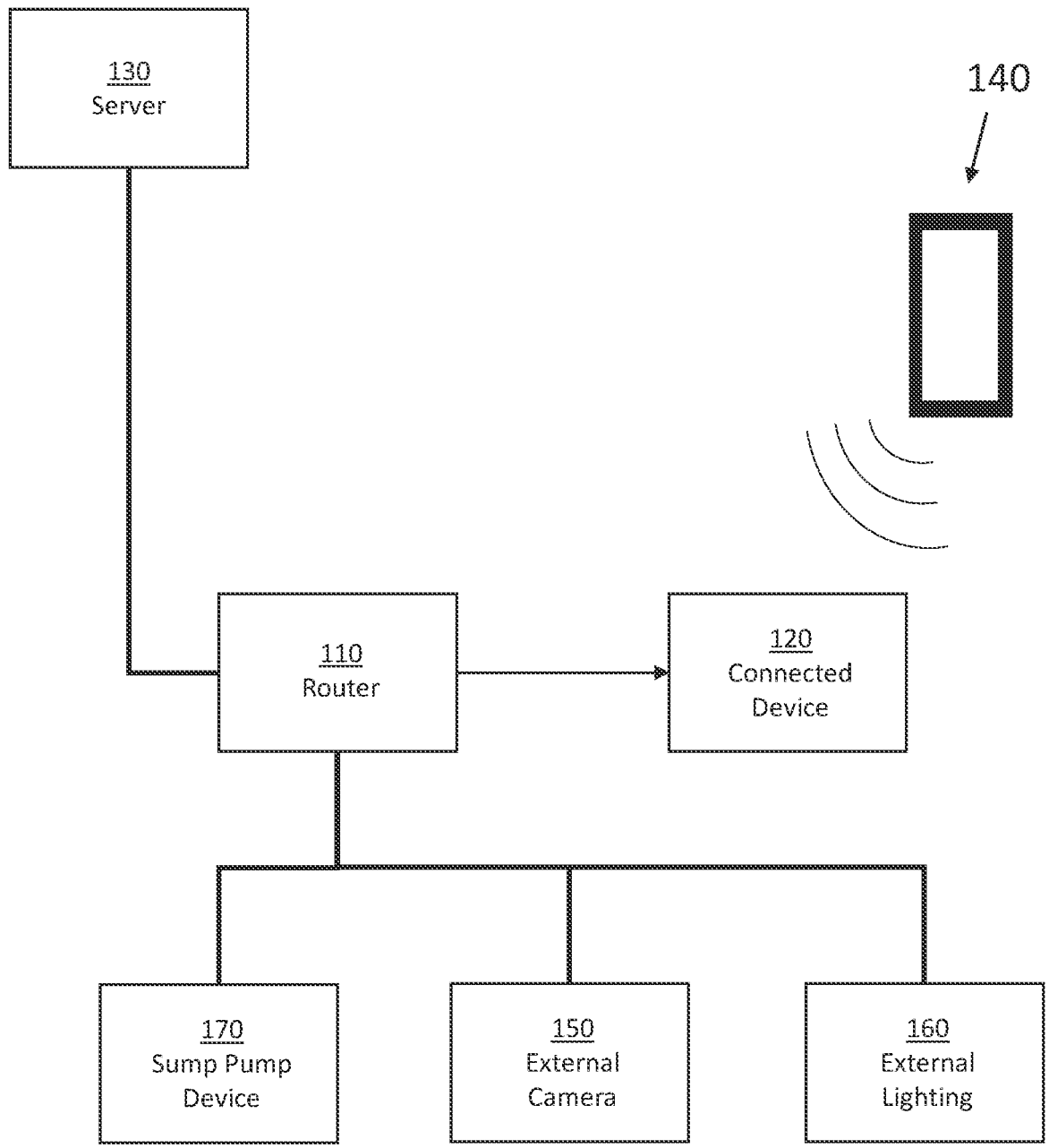
FIG. 1 is a functional block diagram illustrating an operating environment for use of a connected device with external data, in accordance with various embodiments.

The exemplifications set out herein illustrate preferred embodiments of the disclosure, and such exemplifications are not to be construed as limiting the scope of the disclosure in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Smart home devices may be controlled by algorithms on remote servers to perform actions in response to detections or other events. For example, if smart doorbell is activated, the algorithm may control an outdoor light to illuminate. These programming tasks are typically performed by the homeowner using applications provided by the device manufacturers or using a third party application to perform tasks across smart home networks using devices by multiple manufacturers. These algorithms may retrieve external information, such as time of sunset or sunrise, weather information and the like and may adjust the function of the smart home device in response to this external information. Programming these tasks may prove difficult or overly time consuming for new users or may be not performed in a timely manner for time sensitive events.

Tuning now to FIG. 1, a schematic representation of an operating environment 100 for use of the connected device with external data according to an exemplary embodiment is shown. The operating environment 100 may include a server 130, a mobile device 140, a router 110, a connected device 120, an external camera 150, and an external lighting device.

In this exemplary environment 100, the server 130 may be a remote server connected to the router 110 by an internet connection or the like. The remote server 130 may receive and store information related to operation of the connected device 120, data and algorithms stored for use by the connected device, such as weather information, calendar information and the like. For example, the server 130 may access and/store calendar data input by a user in a separate application, such as an online calendar program, for retrieval by the connected device 120 in response to a user input. The server 130 may further retrieve data in response to requests from a user at the connected device 120, and/or may periodically update stored information, such as weather data, news information, podcasts, or the like.

The router 110 is operative to interface with an wide area network connection, local area network connection, wireless network connection or the like, to interface with the server 130, the connected device 120, the mobile device 140, the external camera 150 the external lighting 160 and the like. For example, the router 110 may include a cable modem portion to communicate over a coaxial cable to the server 130 and a wireless network transceiver to communicate wirelessly with the external camera 150 and the external lighting 160. The connected device may be connected to the router 110 via a wired connection such as an ethernet cable or the like. The router 110 may transmit data requests to and from the connected device 120 to the external camera 150 and the external lighting 160. The router 110 may further receive video data from the external camera 150 and route this video data to connected device 120, the server 130 and/or the mobile device 140 to display to a user.

The external camera 150 may be a remotely located camera with an integrated network interface to transmit and receive data via the router 110. The integrated network interface may be operative to transmit data wirelessly via a wireless local area network, of via a wired connection, such as an ethernet connection. The external camera 150 may be configured to capture image data, format the image data into a format suitable for transmission via the network, and to transmit the formatted data via the network to the connected device 120 via the router 110.

The external lighting 160 may be a light fixture where power delivery is controlled by a connected switch. The external lighting 160 may be coupled via a network interface to a wired or wireless network via the router to the connected device 120. The external lighting 160 may control the illumination and intensity of the lighting in response to control signals transmitted by the connected device 120 via the router 110 and the network. The external lighting 160 may receive control signals from the connected device 120 indicative of an illumination state and/or an intensity generated in response to a user input. The control signals may be transmitted by the connected device 120 in response to a schedule input by a user, such as illuminate lights at 50% at 7 pm or illuminate lights at sunset and turn off lights at sunrise.

The mobile device 140 may be a smartphone or the like, with an integrated network interface for transmitting data via a wireless network as well as transmitting data via a cellular telephone network. The mobile device 140 may further transmit and/or receive data via a short range wireless connection, such as Bluetooth®, or near field communications wireless data connection. In some exemplary embodiments, the mobile device 140 may host and execute a software application for receiving user inputs related to smart device instructions and for formatting and transmitting these instructions to the connected device 120. The instruction data may be transmitted via the wireless network via the router 110 to the connected device, or in some embodiments, transmitted directly from the mobile device 140 to the connected device 120. For example, the user may input an instruction to activate the external lighting 160. The data may be received by the connected device 120, the user intent may be determined in response to the received data, and the connected device 120 may transmit a control signal to the external lighting 160 to illuminate the external lighting 160. The data may include a time to illuminate the external lighting 160 and/or a brightness for the external lighting 160. In addition, the mobile device 140 may receive data from the connected device, such as video data captured by the external camera 150 and coupled to the connected device 120. The connected device 120 may then be configured to transmit the video data to the mobile device 140 in response to a user input received at the mobile device and transmitted to the connected device 120.

The connected device 120 may be configured to receive instructions related to control of the various smart devices from the mobile device 140 in response to user inputs. In addition, the user instructions may be via another networked device, such as a computer, key fob, remote control, touchpad or the like. In some exemplary embodiments, the connected device 120 may receive an unsolicited data from the server 130 related to a timely event, such as a weather emergency, traffic accident, emergency alert, or other unpredicted event. For example, the data from the server 130 may be indicative of a crime in progress near the location of the connected device 120. The connected device 120 may then associate a relationship between the data from the server 130 and the external lighting 160 and illuminate the external lighting 160 and external camera 150, illuminate the external lighting 160, activate the external camera 150 and store the captured video from the external camera 150 on a memory device within the connected device 120. This response from the connected device 120 to the data indicative of a crime in progress may not be specifically programmed by the user via the user interface. In some exemplary embodiments, the user may enable external data connection or the like, or may be prompted for permission to provide the captured video to authorities.

In other exemplary embodiments, the connected device 120 may receive a severe weather warning from the server 130 indicative of expected heavy rain. The connected device 120 may then associate a relationship between the severe weather warning and a sump pump device within a user's residence. In response to the relationship, the connected device 120 may transmit a control signal to the sump pump device 170 to perform a test procedure on the sump pump device 170, determine a voltage level of a sump pump backup battery, and perform other diagnostic tests to ensure the sump pump is operative in case of need. The connected device 120 may the receive data from the sump pump device 170 and may transmit a user alert to the mobile device 140 to provide a user alert to the user in response to the sump pump device 170 diagnostic tests.

The exemplary server 130 may be configured to determine smart home device utilization within a residence by monitoring data being transmitted and received within the smart home device network. For example, the server 130 may determine that an Acme® hot water tank controller is being used in response to data being transmitted from the connected device 120 or via the network connection in general, to a particular internet protocol (IP) address associated with the Acme® hot water tank controller. Thus, if the sever 130 determines that a power failure is likely in the location of the smart home device network, the server may transmit a user alert to the connected device 120 within the smart home device network concerning the power failure and steps that may be taken regarding the hot water tank controller, such as increasing the temperature. Alternatively, the server 130 may transmit an action request to the connected device 120 such that the connected device may generate a control signal to transmit to the hot water tank controller increase the temperature of the hot water temporarily. The server 130 may further transmit a user alert to the mobile device 140 via a cellular network or other communications network to notify the user of the potential power failure and actions that could be taken with regards to the hot water tank controller.

In another exemplary embodiment, a server may determine a cold weather event is likely in a location of a smart home device network. The server may transmit an alert to a connected device within the smart home device network indicative of the cold weather event. The connected device may then determine that an external water cutoff device is used within the smart home device network. The connected device may then transmit a control signal to the external water cutoff device to cut water pressure to the external water supply device, such as a external faucet. The external water cutoff device may then cut water pressure to the external water supply device and release water pressure from the external water cutoff device.

Figure 2:
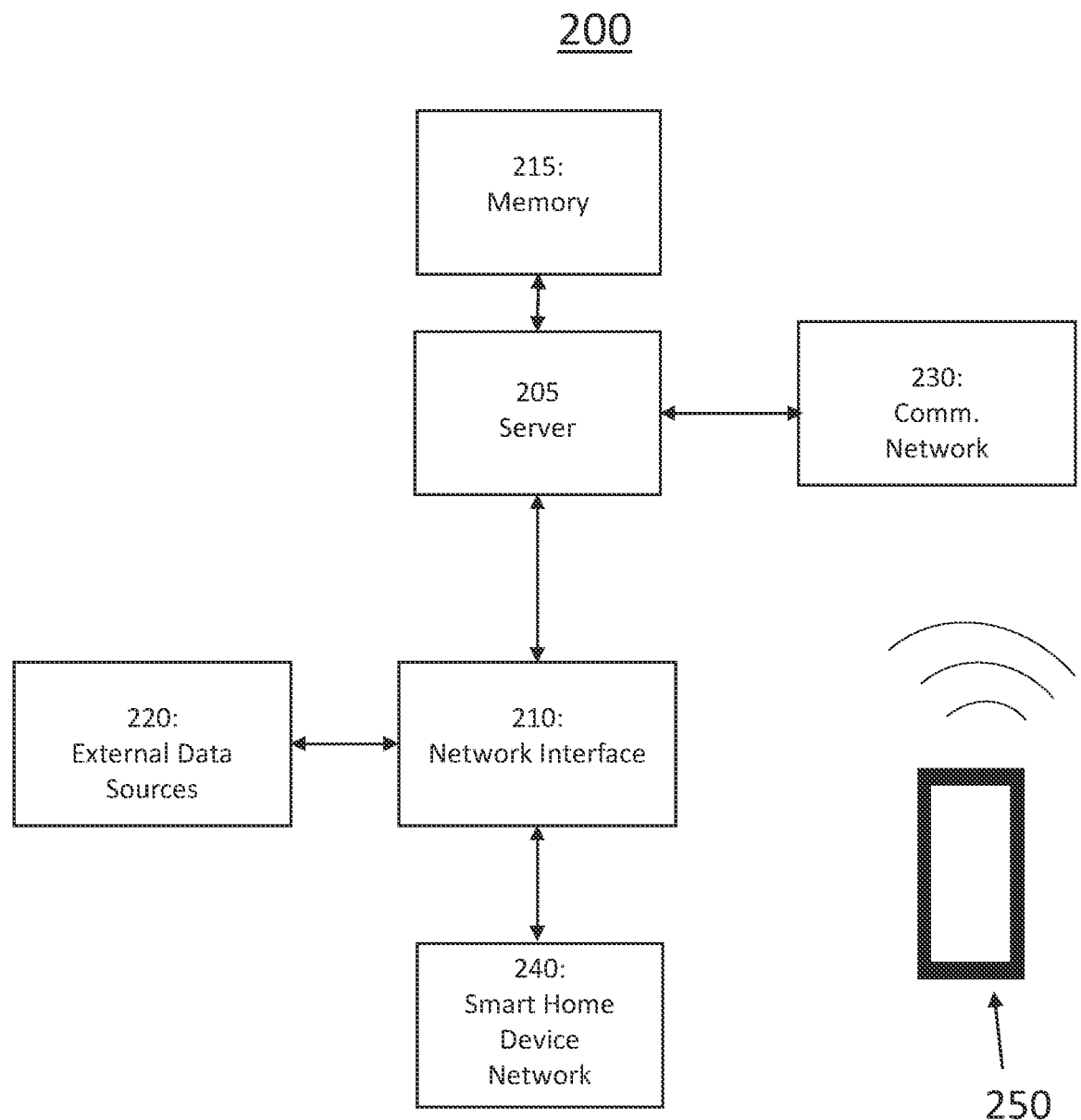
FIG. 2 is a block diagram illustrating an exemplary implementation of a system for connected device control in response to external data, in accordance with various embodiments.

Turning now to FIG. 2, a block diagram illustrating an exemplary implementation of a system 200 for connected device control in response to external data is shown. The exemplary system may include a sever 205, a memory 215, a communications network interface 230, a network interface 210, a smart home device network 240, a mobile device 250, and a source of external data 220.

In this exemplary system 200, the server 205 may observe data transmission between the smart home device network 240 and external data sources 220 and determine the presence of smart home devices in response to the data transmissions. For example, the server 205 may monitor IP addresses and time of transmission of data transmitted from and received by the smart home network device network 240 to external data sources 220 via the network interface 210. From this information, the server 205 may conclude that a particular smart device is used within the smart home device network 240. A lookup table or information file may be stored in a memory 215 communicatively coupled to the server 205. The lookup table information may be used to associate the IP address with a particular connected device. The server 205 may store information related to detected smart devices on the memory 215 or the like. Periodically, the lookup table may be updated is response to publicly available or determined data related to smart home devices. In some exemplary embodiments, the network interface 210 may be integral to the server 205 and the server 205 may form a portion of a internet service provider system.

The server 205 may further be configured to receive timely data from external data sources 220 via the network interface 210. The timely data may be indicative of an emergency event, a weather event, a traffic event, or other non-regularly occurring event. For example, the sever 205 may receive data related to a weather emergency. The server 205 may the associate the weather emergency with a previously identified particular smart home device. The server 205 may the transmit a user alert to a use's mobile device 250 via a communications network 230, such as a cellular data network, where the user alert is indicative of a suggested action to be performed by the user related to the previously identified particular smart alarm. For example, the weather emergency may be a frost warning for the user's area. The previously identified smart devices may be a sprinkler system and a furnace. The user alert may suggest cancelling a watering cycle for the sprinkler system and turning on the furnace. In some exemplary embodiments, applications on the mobile device 250 may be launched in response to the user alert.

Figure 3:
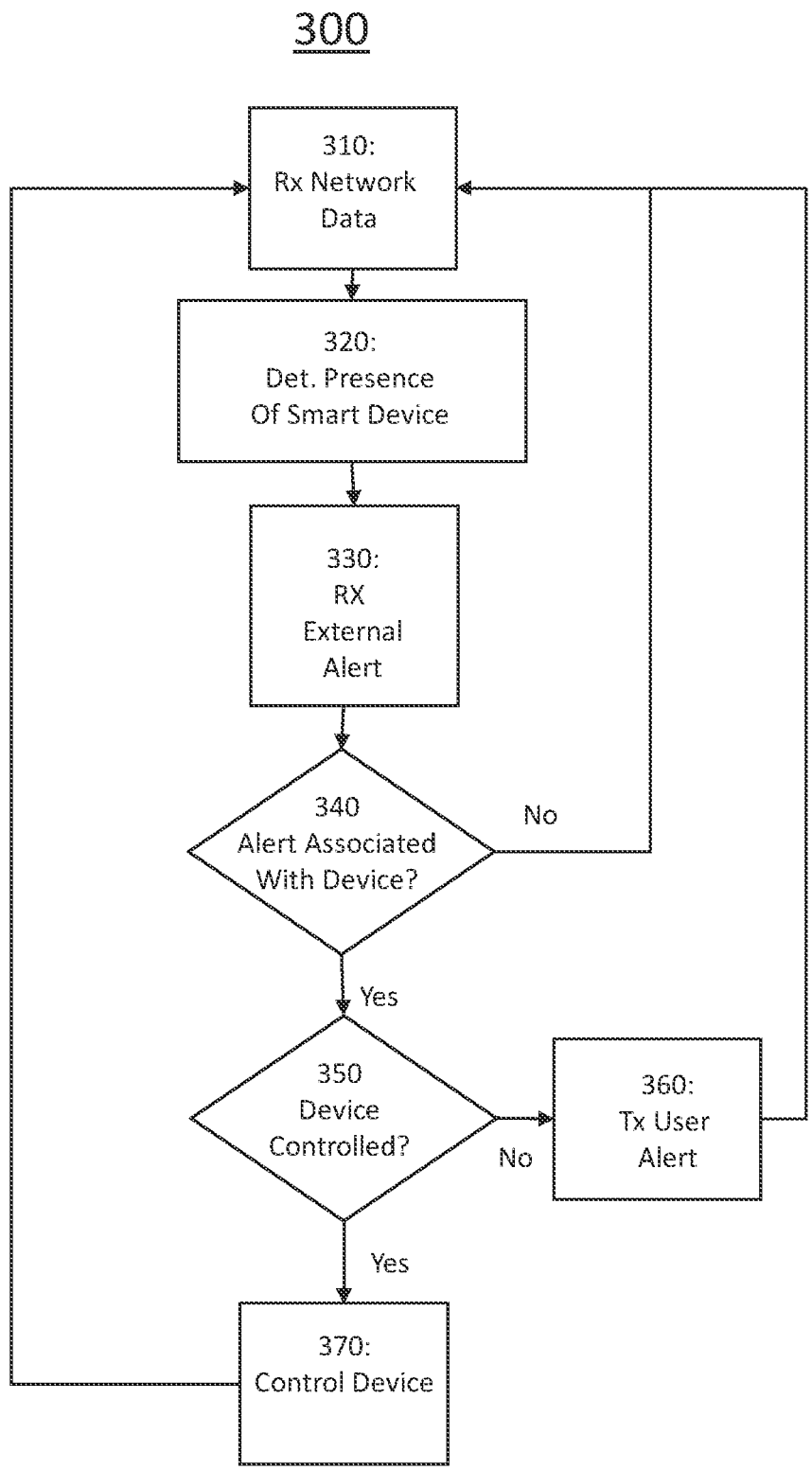
FIG. 3 is a flow chart illustrating an exemplary method for implementation of a system for connected device control in response to external data, in accordance with various embodiments.

Turning now to FIG. 3, a flow chart illustrating an exemplary method 300 for implementation of a system for connected device control in response to external data is shown. The method is first operative to receive 310 network data transmitted to, or received from, a local area network. In some exemplary embodiments, the method may be performed by a server on an internet service provider network. The server may be a head end on an internet service provider network or communicatively coupled to the head end or the like.

The method is next configured to determine 320 if the network data is indicative of a smart home device, such as a connected thermostat, connected hot water tank, connected smart display, home alarm system, smart lighting system or the like. The method may determine if the network data is associated with a smart home device by comparing the IP address of the network data with IP address associated with a smart home device service provider or the like. A list or database of IP addresses associated with smart home device service providers may be stored on a memory communicatively coupled to the server. If the data is associated with a smart home device, the method may then store a data indicative of the presence of the smart home device in a memory or the like.

The method is next operative to receive 330 an unsolicited alert data from an external source, such as a weather advisory, amber alert, traffic alert, or the like. The alert may be received from a public source, a private source or other internet source of data. In some exemplary embodiments, the data may be retrieved or compiled by a server or a service provider. The method next determines 340 if the data is associated with one or more of the detected smart home devices. For example, a detected sump pump controller may be associated with a flood warning and/or severe weather alert. A sprinkler system may be associated with a frost warning. External lighting and cameras may be associated with a crime in progress alert. If the alert is not associated with one or more of the detected smart home devices, the method returns to monitoring network data 310.

If the alert is associated with one or more of the detected smart home devices, the method may next determine 350 if the detected smart home device is controlled by a smart home controller within he smart home device network. If the detected smart home device is controlled by a smart home controller, the method is next configured to transmit 370 a control signal to the smart home controller to control the detected smart home device in response to the received alert data. For example, if a home security controller is present on the smart home device network and is configured to control one or more external cameras, external lighting, and/or a security siren, the method may transmit a control signal to the home security controller requesting that the external lights be illuminated and the video from the external cameras be captured and stored. If the device is not controlled by a smart home controller or the like, an alert may be transmitted 360 to a user notifying the user of possible actions that should be taken with respect to the smart home device. In some exemplary embodiments, if the smart home device cannot be controlled by a smart controller or by commands directly from the service provider or external server, suggestions of controller devices, controller settings, or other control applications may be transmitted to the user along with information associated with the alert data.

Figure 4:
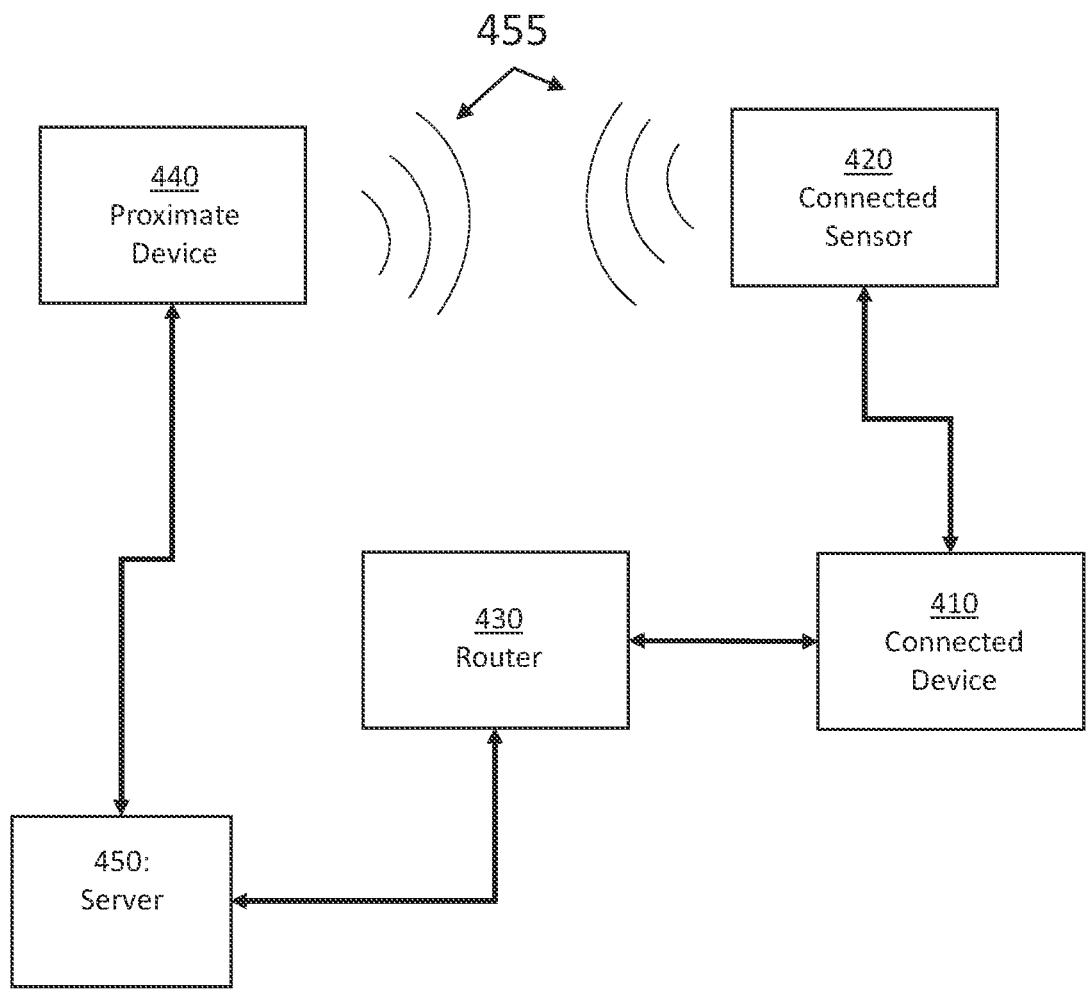
FIG. 4 is a functional block diagram illustrating an operating environment for use of a connected device with external data, in accordance with various embodiments.

Turning now to FIG. 4, a schematic representation of an operating environment 400 for use of the connected device with external data according to another exemplary embodiment is shown. The exemplary operating environment 400 may include a connected device 410, a connected sensor 420, a router 430, a server 450 and a proximate connected device 440.

In this exemplary embodiment, the connected sensor 420 and the proximate connected device 440 may communicate via a wireless transmission channel 455. The connected sensor 420 may be communicatively coupled to the connected device 410 and may be enabled to broadcast alerts to proximate devices, such as the proximate connected device 440 via the wireless transmission channel 455. In some exemplary embodiments, the proximate connected device 440 may be enabled or programmed to monitor for external alerts from proximate devices. The proximate connected device 440 may detect the alert from the connected sensor 420. The alert may be configured in a standard format allowing the proximate connected device 440 to determine an identifier for the alert. In some embodiments, the proximate connected device 440 may transmit the identifier for the alert to the server 450 in order to receive specific instructions or actions to take related to the alert for the proximate connected device 440.

In some exemplary embodiments, the connected sensor 420 may be an outside temperature sensor. The connected sensor 420 may detect freezing conditions or may predict upcoming freezing conditions. The connected sensor 420 may broadcast an alert indicative of the freezing conditions via the wireless transmission channel 455. In some exemplary embodiments, the broadcast would be a one directional transmission between the connected sensor 420 or connected device 410 and proximate connected devices. For example, the proximate connected device 440 and the connected device 410 and/or the connected sensor 420 may be owned by the same user, but may not be enabled to communicate with each other. This exemplary system may allow the connected devices from different manufacturers or different networks to exchange critical data. In some exemplary embodiments, the proximate connected device 440 may be a sprinkler controller. The proximate connected device 440 may receive the alert via the wireless transmission channel 455 as part of the general broadcast. The proximate connected device 440 may determine an action related to the alert, such as purging water from the sprinkler lines in response to the possible freezing condition. Alternatively, the proximate connected device 440 may transmit a warning to a user device of an owner or operator of the proximate connected device 440 indicative of the upcoming freezing condition and possible actions required to be taken by the owner or operator. In some embodiments, the alert may be transmitted via the internet or other network to proximate devices to the connected sensor 420.

Figure 5:
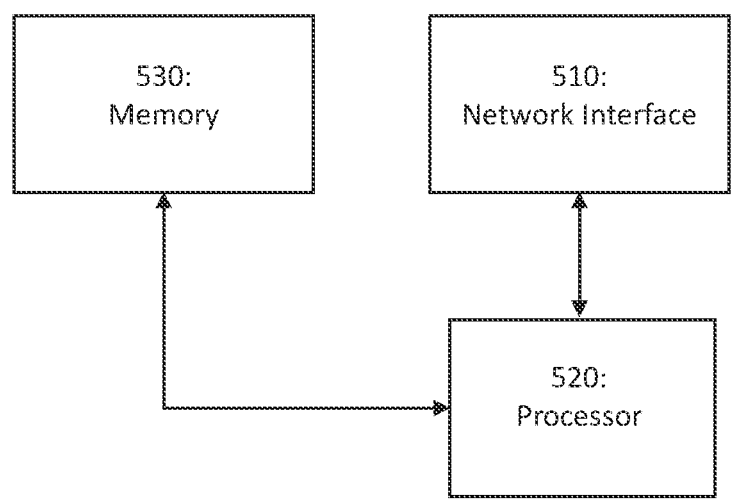
FIG. 5 is a block diagram illustrating an exemplary implementation of a system for connected device control in response to external data, in accordance with various embodiments.

Turning now to FIG. 5, an exemplary device 500 for controlling a smart home device is shown. The exemplary device 500 may include a network interface 510, a processor 520, and a memory 530. In some embodiments, the exemplary device 500 may be a server which forms a portion of an internet service provider gateway. In some embodiments, the smart home device may a camera and wherein the function is a capture of an image and storing of the image in a memory.

The network interface 510 may be configured for receiving an data packet transmitted by a smart home device, for receiving an event alert from an external data source, and for transmitting a control signal to the smart home device. The network interface 510 may be a wired network interface, such as a local area network ethernet interface, or may be a wireless network interface, such as a cellular network interface or a wireless local area network interface. In some exemplary embodiments, the event alert may be an alert of a nearby crime in progress. Alternatively, the event alert may be a severe weather alert received from a national weather service.

The processor 520 may be configured for detecting the smart home device in response to an internet protocol address of the data packet, for determining a function of the smart home device, and for generating the control signal to initiate the function of the smart home device in response to the event alert being associated with the function of the smart home device. The processor 520 may be further configured for generating a user alert indicative of the function of the smart home device and transmitting the user alert to a mobile device via the network interface 510. The processor 520 may be further configured for determining a connected device manufacturer and/or a connected device service provider in response to the internet protocol address and data stored in the memory 530. The processor 520 may be configured for detecting the smart home device in response to a time interval between a plurality of data packet transmissions to the internet protocol address in response to data stored in the memory 530.

The memory 530 may be communicatively coupled to the processor 520 for receiving and storing an identifier of the smart home device and wherein the processor 520 is further operative to generate the identifier of the smart home device in response to the detection of the smart home device.

In some exemplary embodiments the exemplary device 500 may be smart home hub may include a network interface 510 for receiving an data packet transmitted by a smart home device, for receiving an event alert from an external data source, and for transmitting a control signal to the smart home device. The smart home hub may further include a processor 520 for determining a function of the smart home device, and for generating the control signal to initiate the function of the smart home device in response to the event alert being associated with the function of the smart home device. The processor 520 may be further operative to generate a user authorization request and wherein the function of the smart home device is initiated in response to an affirmative user response to the user authorization request.

Figure 6:
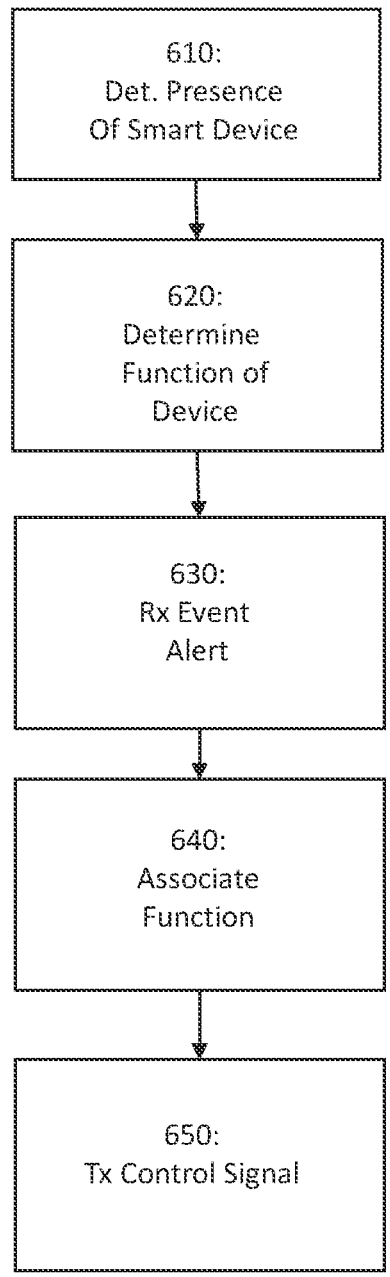
FIG. 6 is a flow chart illustrating an exemplary method for implementation of a system for connected device control in response to external data, in accordance with various embodiments.

Turning now to FIG. 6, an exemplary method, performed by a server, for controlling a smart home device is shown. In some exemplary embodiments, the server may form a portion of an internet service provider gateway. The method is first configured for detecting 610 a smart home device in response to an internet protocol address of a data packet transmitted on a network. The smart home device may be detected in response to network traffic on a wireless network or internet gateway. The method may compare the internet protocol address of the network traffic with a list or lookup table of connected device service provider. In response to determining the connected device service provider, the method may estimate the nature of the device. In response to detecting a smart home device, the method may store an identifier of the smart home device on a memory communicatively coupled to the server. In some embodiments, detecting the smart home device includes determining a connected device manufacturer and a connected device service provider.

Additionally, the smart home device may be detected in response to a time interval between a plurality of data packet transmissions to the internet protocol address. For example, if a data packet is transmitted every 3 minutes, the method may determine by referencing a lookup table or stored data that a connected doorbell typically transmits a data packet every 3 minutes during standby operation. The method may in turn assume that the smart home device is a connected doorbell or may transmit a query to a user to determine if a connected doorbell is being used. The user may confirm or deny the use of the connected doorbell, the manufacturer, the function of the smart home device or the like.

The method is next configured for determining 620 a function of the smart home device. In response to the identification of the connected device service provider and/or the nature of the connected device, the method may next determine the function of the smart home device. For example, if the service provider is a sprinkler system control service provider, the method may assume that the connected device is a sprinkler controller. In other exemplary embodiments, the method may determine that the smart home device is a hot water tank controller. The method may then store an indicator of the presence of the hot water tank controller on a memory. The smart home device may a camera and wherein the function is a capture of an image and storing of the image in a memory.

The method next receives 630 an event alert from an external data source. In some exemplary embodiments, the event alert may be a severe weather alert received from a national weather service or an alert of a nearby crime in progress broadcast by a local police department or other security service.

In response to receiving the event alert, the method is configured for associating 640 the function of the smart home device with the event alert.

The exemplary method is next configured for transmitting 650 a control signal to initiate the function of the smart home device in response to the association of the function with the event alert. In some exemplary embodiments, the method may be further configured for generating a user alert indicative of the function of the smart home device and transmitting the user alert to a mobile device. Thus, the method may detect the function of the smart home device, such as a sprinkler controller, and then transmit the user alert to a mobile device of a user of the connected device indicative of actions to be taken by the user with respect to the sprinkler controller, such as purging water from sprinkler lines before a freezing event.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An automated process to be performed by a media player device to control a smart home device, the automated process comprising:

receiving, by a television receiver of the media player device, a television broadcast for presentation to a viewer via a display;

detecting, by the media player device, a smart home device based upon a network address used by the smart home device to transmit a data packet on a network, wherein the media player device communicates on the network but the data packet is not sent from the smart home device to the media player device;

automatically determining a function of the smart home device by the media player device comparing the network address of the smart home device detected by the media player device to a list of known smart home devices and associated functions, wherein the list of known smart home devices and their associated functions is maintained in stored data of the media player device;

subsequently receiving, by the media player device, an event alert from an external data source via the network, wherein the event alert is unsolicited by the media player device;

automatically associating, by the media player device, the received event alert with the function of the smart home device that was automatically determined by the media player device; and in response to the event alert, transmitting a control signal from the media player device to the smart home device via the network to direct the smart home device to perform the function of the smart home device that is associated with the event alert.

2. The automated process of claim 1 wherein the television broadcast is a direct broadcast satellite broadcast.

3. The automated process of claim 1 wherein the event alert is a severe weather alert received from a national weather service.

4. The automated process of claim 1 wherein the event alert is an alert of a nearby crime in progress.

5. The automated process of claim 4 wherein the smart home device is a camera and wherein the control signal directs the camera to capture an image and to store the image in a memory.

6. The automated process of claim 5 further including generating a user alert that includes the image and transmitting the user alert to a mobile device.

7. The automated process of claim 1 wherein detecting the smart home device includes determining a connected device manufacturer and a connected device service provider based upon the network address of the packet received from the smart device via the network.

8. The automated process of claim 1 wherein network address is a media access control (MAC) address of the smart home device.

9. A media player device comprising a television receiver, a processor, a non-transitory data storage and an interface to a network, wherein the non-transitory data storage comprises instructions that are executable by the processor to perform an automated process comprising:

receiving, by the television receiver, media content encoded by a broadcast television signal;

rendering the received media content for playback to a viewer;

detecting, by the media player device, a smart home device having a network address in response to the media player device receiving a data packet transmitted on the network, the data packet comprising the network address of the smart home device, wherein the media player device communicates on the network but the data packet is not sent from the smart home device to the media player device;

automatically determining, by the media player device, a function of the smart home device and an external data source associated with the smart home device based upon the network address of the data packet received from the smart home device detected by the media player device via the network, wherein the determining comprises comparing the network address of the data packet to a list of known smart home devices and their associated functions that is maintained in the non-transitory data storage of the media player device;

receiving, by the media player device, an event alert from the determined external data source via the network;

automatically associating, by the media player device, the received event alert with the function of the smart home device that was automatically determined by the media player device; and transmitting a control signal from the media player device to the smart home device via the network in response to the receiving the event alert to thereby initiate the automatically determined function associated with the smart home device.

10. The media player device of claim 9 wherein the smart home device is a camera, and wherein the received event alert describes an event occurring in proximity to the camera, wherein the control signal directs the camera to capture an image of the event occurring in proximity to the camera and wherein the automated process further comprises transmitting a message to a mobile device associated with a user of the media player device that comprises the image captured by the camera in response to the event alert.

11. The media player device of claim 10, wherein the media player device is a set top box.

12. The media player device of claim 10 wherein the media player is a set top box configured to receive the broadcast television signal from a direct broadcast satellite.

* * * * *